United States Patent [19]

Soderholm et al.

[11] 4,331,881
[45] May 25, 1982

[54] FIELD CONTROL FOR WIND-DRIVEN GENERATORS

[75] Inventors: Leo H. Soderholm; James F. Andrew, both of Ames, Iowa

[73] Assignee: The United States of America as represented by the Secretary of Agriculture, Washington, D.C.

[21] Appl. No.: 193,877

[22] Filed: Oct. 3, 1980

[51] Int. Cl.³ .............................. F03D 9/00; H02P 9/14
[52] U.S. Cl. ................................... 290/44; 322/35
[58] Field of Search ...................... 290/55, 44; 322/35

[56] References Cited

U.S. PATENT DOCUMENTS

| | | | |
|---|---|---|---|
| 1,778,793 | 10/1930 | Constantin | 290/44 |
| 3,974,395 | 8/1976 | Bright | 290/44 |
| 4,095,120 | 6/1978 | Moran et al. | 290/44 |
| 4,160,170 | 7/1979 | Harner et al. | 290/44 |
| 4,168,439 | 9/1979 | Palma | 290/44 |

FOREIGN PATENT DOCUMENTS 52-57926  5/1977  Japan ........................... 332/35

OTHER PUBLICATIONS

Jayadev; Windmills Stage a Comeback; IEEE Spectrum; p. 47; Nov. 1976.

Primary Examiner—J. V. Truhe
Assistant Examiner—Shelley Wade
Attorney, Agent, or Firm—M. Howard Silverstein; David G. McConnell; Curtis P. Ribando

[57] ABSTRACT

The field current of a wind-driven generator is automatically controlled in response to a first signal representing the wind speed and a second signal representing the impeller tip speed so as to continuously load the wind machine to the extent necessary for maintaining a constant tip speed/wind speed ratio, thereby optimizing the performance of the machine.

6 Claims, 2 Drawing Figures

FIELD CONTROL FOR WIND-DRIVEN GENERATORS

BACKGROUND OF THE INVENTION

1. Field of the Invention

The performance of a wind machine as related to power output is a function of the efficiency at which the machine extracts energy from the windstream. This phenomenon can be expressed as $C_p = P_o/P_w$ where $C_p$ is the power coefficient or coefficient of performance, $P_o$ is the power output, and $P_w$ is the power in the windstream. Kinetic theory dictates that the maximum value for $C_p$ is 59%. The actual value is in part a function of the airfoil characteristics and configuration. For a given design, $C_p$ is also dependent upon the rotational velocity of the airfoil, measured at its radial extremity or tip, in relation to the free-flow wind velocity. This relationship is commonly referred to as the tip speed/wind speed ratio, or simply the tip speed ratio.

Since the wind velocity at a given site tends to fluctuate, it is apparent that failure of an airfoil to react to such fluctuations would have a substantial impact on the operational efficiency of the machine. This invention relates to a control system for responding to changes in wind velocity so as to maintain a machine's operation at substantially peak performance.

2. Description of the Prior Art

A control system for a vertical axis turbine is taught by F. N. Palma in U.S. Pat. No. 4,168,439. This device is responsive to the prevailing wind speed and is designed to pivot the airfoil blades in order to achieve maximum aerodynamic efficiency. A tachometer is provided to signal the attainment of predetermined speeds for switching from one mode of operation to another. Similarly, in U.S. Pat. No. 4,160,170, Harner et al. shows a system for controlling the blade angle of a wind turbine in response to changes in wind velocity. While the devices of Harner et al. and Palma influence the operational efficiency of their respective wind machines by varying the configuration of the airfoil, they are unable to directly alter tip speed in response to wind speed. Their use is therefore limited to variable pitch turbines.

Moran et al., U.S. Pat. No. 4,095,120, teaches a system adaptable for use with a fixed blade turbine for improving the efficiency of a wind-driven generator. This system includes a generator speed sensor which cooperates with appropriate circuitry for incrementally controlling the field current. In U.S. Pat. No. 3,974,395, Bright also shows a field control system for a wind-driven electrical generator. Bright employs a tachometer coupled to the impeller shaft for generating an output signal representative of wind velocity. This signal is applied to a field control circuit, thereby adjusting the field current of the generator. A limitation characteristic of the systems of Moran et al. and Bright is that the tachometer signal in each case is not necessarily indicative of the actual wind velocity, insofar as the rotational speed of the impeller or shaft is influenced by the load on the generator. This discrepancy results in an inaccurate application of field current for attaining the optimum tip speed ratio.

SUMMARY OF THE INVENTION

We have now discovered a method and apparatus for precisely controlling the field current on a wind-driven generator, whereby the tip speed ratio can be readily held at a substantially constant, predetermined optimum value. The invention involves:

(a) providing a first input signal representing the wind speed;

(b) providing a second input signal representing the tip speed of the impeller;

(c) feeding the first and second input signals into a comparison circuit whereby an output signal is obtained, wherein the output signal is responsive to the first and second input signals and represents the field voltage that must be applied to the generator field winding to maintain the predetermined tip speed/wind speed ratio; and (d) feeding the output signal into a means responsive to that signal for applying the appropriate voltage to the generator field winding, whereby when the tip speed/wind speed ratio exceeds the predetermined optimum value, the field voltage is increased; and when the ratio is below the predetermined value, the field voltage is decreased.

In accordance with this discovery, it is an object of the invention to provide a system for maximizing the overall efficiency of wind machines which do not require a constant output.

Another object of the invention is to provide a wind machine control system which can be employed with both variable pitch and fixed blade impellers.

It is also an object of the invention to devise a highly responsive control circuit for use in combination with a wind machine for continuously and independently monitoring both the instantaneous impeller tip speed and the instantaneous wind speed, and for maintaining a predetermined constant ratio between the two speeds by controlling the load on the machine.

It is a general object of the invention to continuously and precisely match the load on a wind machine to the power available in the wind.

Other objects and advantages of this invention will become readily apparent from the ensuing description.

DETAILED DESCRIPTION OF THE INVENTION

The category of wind machines for which the invention has utility is inclusive of most conventional fixed blade and variable pitch impeller-driven types wherein the energy of the wind is converted to the torque of a rotatable shaft. The American multi-bladed farm windmill, the single-, double-, and triple-bladed horizontal axis props, the cross-wind Savonius, and the Darrius are merely illustrative of the numerous applicable designs. The prime movers of these machines are typically used to drive an electrical generator, operate a mechanical pump or convert the torque thereof directly into heat energy. While it is envisioned that the instant invention could be used for controlling any conventional type of output, it is most readily adaptable to either an AC or DC generator. The particular type is not critical, though it is understood that because of the variable speed of the machine, it would not be practical to employ an induction generator. For purposes of illustration, the control of an alternator will be described in the ensuing description.

Figure 1:
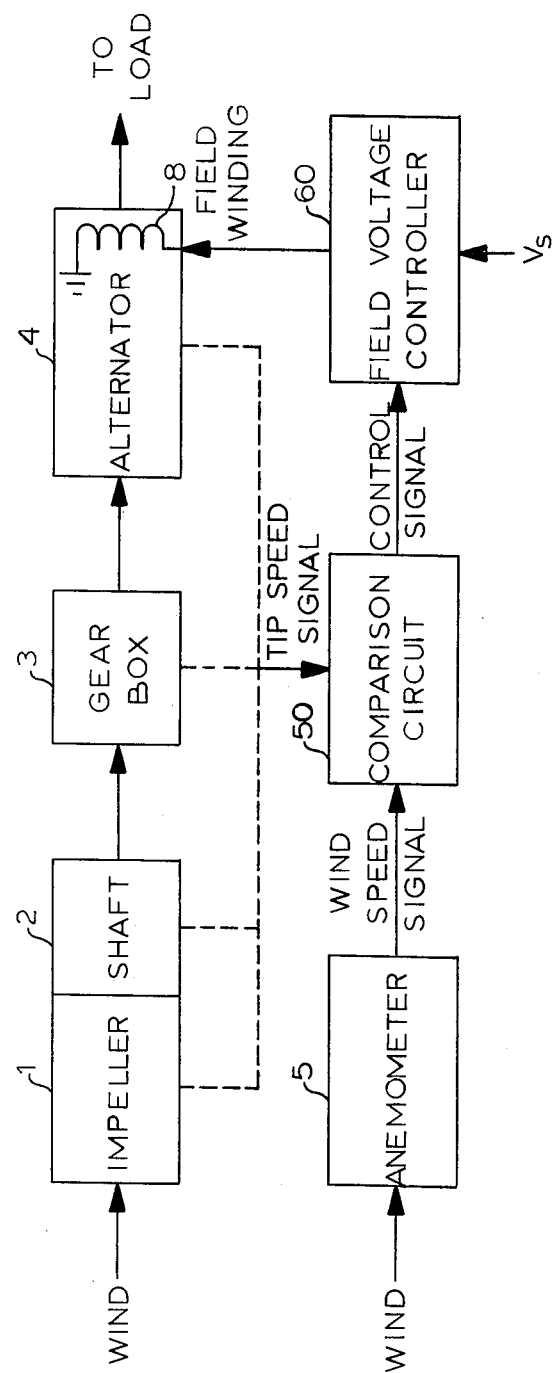
FIG. 1 is a block diagram depicting the operation of the invention.

Referring to FIG. 1, the wind drives impeller 1 which transfers the wind's energy into the torque of rotatable shaft 2. In the typical arrangement, a gear box 3 or some other conventional type of transmission is employed in order to step up the rotational velocity to the extent necessary for the output of alternator 4 to be at the approximate desired frequency.

The tip speed signal may be derived from any convenient measurement representing the speed of revolution. For instance, this value could be directly determined optically from impeller 1, or indirectly by means of a tachometer coupled to shaft 2 or gear box 3. We have also found the frequency of the AC voltage generated by the alternator to be a suitable source for the tip speed signal. The wind velocity can be measured by any conventional sensing device 5 such as a 3-cup anemometer, a hot wire anemometer, a sonic anemometer, or other means designed to emit an electrical signal indicative of the wind speed.

Both the tip speed signal and the wind speed signal are applied as inputs to comparison circuit 50. This circuit is designed to provide a field voltage control output signal roughly proportional in magnitude to the covarying wind speed and tip speed, but tempered by the difference between the actual tip speed ratio and a predetermined optimum ratio. The operation of this circuit is described in further detail below.

The field voltage control signal from comparison circuit 50 is fed into field voltage controller 60 which acts to control the voltage source $V_s$ in proportion to the signal, thereby controlling the field voltage to winding 8 of alternator 4. It is readily apparent that with a fixed load on the alternator, the load imparted to the impeller would be proportional to the field voltage. As the load on the impeller is increased, the tip speed tends to decrease and vice versa. Therefore, by varying the voltage on winding 8 in response to the output signal from circuit 50, the load on impeller 1 can be controlled for maintenance of the proper tip speed in relation to the wind velocity measured by anemometer 5. By virtue of this mechanism, the system will accommodate changes in the instantaneous wind speed as well as changes in the impeller speed caused by the wind and the load imparted by the alternator.

Figure 2:
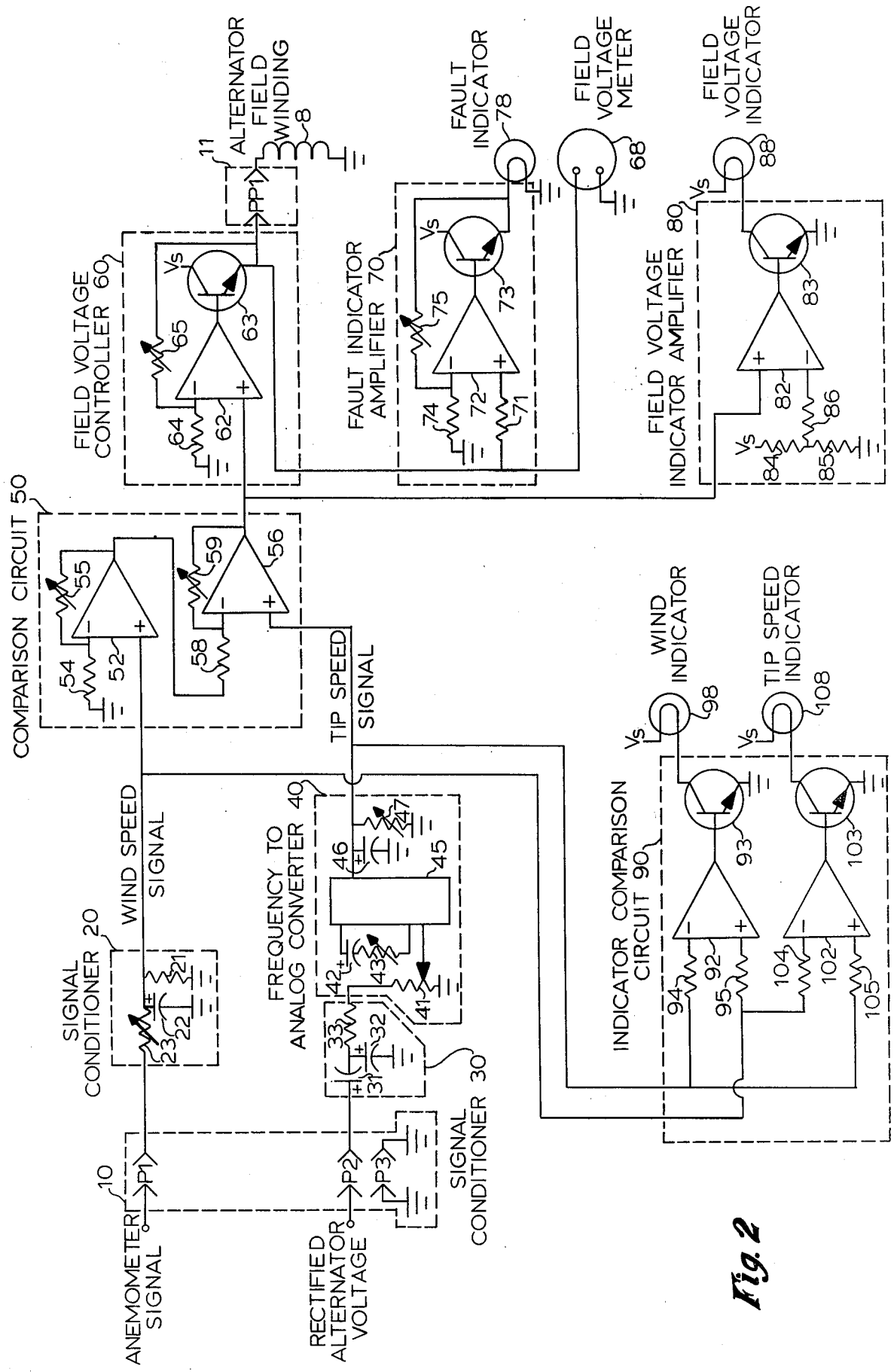
FIG. 2 is a detailed schematic diagram depicting a specific embodiment of the invention.

FIG. 2 illustrates circuitry for implementing the signal comparison of block 50 and the field voltage control of block 60 referred to in FIG. 1. An analog signal from a 3-cup anemometer is conducted on pin P1 of plug-and-socket input 10 to conditioner 20. Within the conditioner, resistor 21 provides proper loading for the anemometer generator, filter capacitor 22 removes ripple, transient and noise voltages, and variable resistor 23 sets the output of the conditioner to some arbitrary value per unit of wind velocity. This output becomes the wind speed signal input to the comparison circuit 50.

As mentioned above, the frequency of the alternator output voltage serves as a convenient source for the tip speed signal, insofar as it is a function of the rotational velocity of the impeller. In the embodiment of FIG. 2, rectified alternator output voltage is introduced to pin P2 of plug-and-socket 10 as it is obtained from an unfiltered three-phase rectified bridge (not shown) electrically coupled to a three-phase wind-driven alternator. As this DC voltage enters signal conditioner 30 it is blocked by capacitor 31, but the ripple voltage associated therewith is passed as an AC signal. Capacitor 32 in conjunction with resistor 33 acts as a wave shaping filter. Of course, it is understood that unrectified AC alternator output could have been used directly as the source of the tip speed signal thereby obviating the need for capacitor 31.

The output of signal conditioner 30 is applied to frequency-to-analog converter 40, the main component of which is integrated circuit (IC) 45 for converting frequency to DC (analog) voltage. Voltage divider 41 is the sensitivity adjustment for IC 45 and capacitor 42 in conjunction with variable resistor 43 adjusts its full-scale range. Capacitor 46 acts as an output filter for the analog voltage and resistor 47 sets the output of converter 40 to an arbitrary voltage per unit of impeller speed.

Circuit 50 is a differential amplifier designed to compare the relative magnitudes of the wind signal from conditioner 20 and the tip speed signal from converter 40. The wind signal is applied to the noninverting input of operational amplifier 52. Resistors 54 and 55 provide the reference voltage for the amplifier. Additionally, resistor 55 is assisted by resistor 54 in providing feedback from the amplifier's output to its inverting input for the purpose of controlling the stage gain. The wind signal output is applied to the inverting input of amplifier 56 and becomes the reference voltage source therefor. This signal varies directly with changes in wind speed and is compared with the tip speed signal applied to the noninverting input of amplifier 56. A field voltage control signal as a function of both the absolute and the relative values of the tip speed input and the wind speed input is obtained as an output as described below under "Operation of the Invention." Variable resistor 59 is assisted by resistor 58 in providing feedback from the output of amplifier 56 to its inverting input for adjusting the amplifier's stage gain.

The field voltage control signal is applied to the noninverting input of driver stage 62 in the field voltage controller 60. Driver stage 62 is direct coupled to the base of output transistor 63 in an amplified emitter-follower configuration which provides both quick response and low impedance output. Resistors 64 and 65 provide the reference voltage to the inverting input of driver 62, and the direct coupled configuration allows the adjustable feedback resistor 65 to control the gain of this stage. A preselected regulated DC voltage supply $V_s$ is applied to output transistor 63. The transistor provides a field drive signal to the alternator field winding 8 through pin PP1 of plug-and-socket 11.

The field drive signal is also applied to a field voltage meter 68 and to a fault indicator amplifier 70. Amplifier 70 has the same type of emitter-follower configuration as the field voltage controller 60. The field drive signal is applied from resistor 71 to the noninverting input of the driver stage 72. The output of the driver stage is coupled to the transistor 73 which is supplied by the regulated voltage $V_s$. The amplifier emitter-follower configuration with resistors 74 and 75 provide the reference to the inverting input and feedback to this stage. If the field drive signal exceeds a predetermined limit as set by resistor 75, an alarm signal is supplied to transistor 73 which turns the fault indicator lamp 78 ON.

The field voltage control signal from comparator 56 is also used to drive the field voltage indicator amplifier 80 and is applied to the noninverting input of driver stage 82. Resistors 84, 85, and 86 set the reference voltage from supply $V_s$ at the inverting input. Whenever the voltage at the noninverting input exceeds the reference voltage, an output signal is supplied to transistor 83 which turns the field voltage indicator lamp 88 ON. When the lamp is ON, it indicates that the system is ON and that the wind speed and tip speed have attained a predetermined relationship.

The indicator comparison circuit 90 is designed to verify normal operation of the control system. The wind signal from conditioner 20 is equally applied across resistor 95 to the noninverting input of operational amplifier 92 and across resistor 104 to the inverting input of operational amplifier 102. The tip speed signal from converter 40 is equally applied across resistor 94 to the inverting input of op amp 92 and across resistor 105 to the noninverting input of op amp 102. The output of op amp 92 is coupled to transistor 93 which has a driving relationship to wind indicator lamp 98. The internal circuitry of the amplifier is designed such that under normal operation lamp 98 is ON. If the tip speed signal should exceed the wind speed signal by a voltage level as determined by resistors 94 and 95, then transistor 93 would be signaled to turn wind indicator 98 OFF. Similarly, the output of op amp 102 is coupled to transistor 103 which has a driving relationship to tip speed indicator lamp 108. Under normal operating conditions lamp 108 is ON. If the wind speed signal should exceed the tip speed signal by a voltage level as determined by resistors 104 and 105, then transistor 103 would be signaled to turn tip speed indicator 108 OFF.

OPERATION OF THE INVENTION

When there is no wind, it is understood that the impeller 1, the shaft 2, the gear box 3, and the rotor of alternator 4 will all be immobile. Accordingly, both the wind speed signal and the tip speed signal will be nil, as will be the output of the alternator. At the onset of wind, an analog signal is transmitted from anemometer 5 through signal conditioner 20 and to the noninverting input of amplifier 52 in comparison circuit 50. The magnitude of the output signal from amplifier 52 will of course be a function of the amplifier gain as determined by resistors 54 and 55. This signal is applied to the inverting input of amplifier 56. However, until the impeller begins to rotate, the tip speed signal will continue to be nil and the output of amplifier 56 will be driven to zero by the wind signal at the inverting input. This condition results in zero voltage being supplied to the field winding 8 by field voltage controller 60. Once the impeller commences rotation in response to the wind, the residual magnetism in the alternator will produce enough of an output voltage to generate a tip speed signal via signal conditioner 30 and converter 40. This signal is proportional to the frequency of the alternator output and is applied to the noninverting input of amplifier 56. As soon as the tip speed signal exceeds a critical wind speed signal as set by feedback resistors 58 and 59, amplifier 56 will apply a positive output to the noninverting input of driver stage 62. Transistor 63 will respond with a voltage to the field winding in proportion to the magnitude of the signal applied to the driver stage. Under normal operating conditions, the tip speed signal will always exceed the critical wind speed signal resulting in the continuous application of voltage to field winding 8. Ideally, when the tip speed and wind speed are in their predetermined optimum ratio, the field voltage will be such that the load imparted to the alternator and in turn to the impeller will tend to maintain that ratio. As the tip speed and wind speed covary in their optimum proportion, the control signal from amplifier 56 and the field voltage will also covary in a direct relationship. In the event that the wind speed were to exceed that required for the optimum ratio, the control signal from amplifier 56 would decrease, thereby reducing the field voltage and the load on the alternator. This would permit the impeller to gain speed until the proper tip speed ratio was reestablished and the input signals to amplifier 56 resumed their proper relationship. Conversely, if the tip speed were to exceed that required for the optimum ratio, the control signal from amplifier 56 would increase, resulting in more voltage being supplied to the winding 8. This would increase the load on the generator, thereby slowing down the impeller and returning the tip signal to its proper relationship with the wind speed signal.

Obviously, the component values of the above-described circuitry would have to be specifically selected for each wind machine, depending on the size and configuration of the impeller, the transmission gear ratio, the design of the alternator, and the like. Once the characteristic curve of the alternator is determined as within the ordinary skill of a person in the art, then the requisite field voltage which must be applied to obtain maximum power output for a given set of tip speed and wind speed conditions can be readily ascertained. The values of the various components of the control circuitry are then appropriately selected. Of course once the variable resistors are properly adjusted, a circuit could be reconstructed substituting fixed resistors with corresponding values. Other substitutions in circuitry design are envisioned, particularly as necessitated by the manner of obtaining the input signals.

It is understood that the foregoing detailed description is given merely by way of illustration and that modification and variations may be made therein without departing from the spirit and scope of the invention.

We claim:

1. A control device for operating a wind machine at maximum efficiency by maintaining a substantially constant, predetermined optimum tip speed/wind speed ratio wherein said wind machine is characterized by an impeller for extracting the wind energy and a generator for converting said energy to electricity, the apparatus comprising:
   (a) means for providing a first input signal representing the velocity of the wind;
   (b) means for providing a second input signal representing the tip speed of the impeller;
   (c) a comparison circuit comprising a differential amplifier for comparing said first input signal with said second input signal and for generating an output signal responsive to said first and second input signals, wherein said output signal represents the field voltage that must be applied to the generator field winding to maintain said predetermined tip speed/wind speed ratio; and
   (d) means responsive to said output signal for applying the appropriate voltage to the generator field winding, whereby when the actual tip speed/wind speed ratio exceeds the predetermined optimum ratio, the field voltage is increased; and when the actual ratio is below the predetermined ratio, the field voltage is decreased.

2. The control device as described in claim 1 wherein said means for providing a first input signal is an anemometer generator.

3. The control device as described in claim 1 wherein said means for providing a second input signal comprises a combination of: (1) a signal conditioner for isolating ripple voltage from the generator output voltage; and (2) a frequency-to-analog converter for converting said ripple voltage to said second input signal.

4. The control device as described in claim 1 wherein said means for applying the appropriate voltage to the generator field comprises a linear amplifier.

5. The control device as described in claim 1 wherein said generator is an alternator.

6. A method of operating a wind machine at maximum efficiency by maintaining a substantially constant, predetermined optimum tip speed/wind speed ratio, wherein said wind machine is characterized by an impeller for extracting the wind energy and a generator for converting said energy to electricity, the method comprising:

(a) providing a first input signal representing the velocity of the wind;
(b) providing a second input signal representing the tip speed of the impeller;
(c) feeding said first and second input signals into a comparison circuit comprising a differential amplifier whereby an output signal is obtained, wherein said output signal is responsive to said first and second input signals and represents the field voltage that must be applied to the generator field winding to maintain said predetermined tip speed/wind speed ratio; and
(d) feeding said output signal into a means responsive to said output signal for applying the appropriate voltage to the generator field winding, whereby when the actual tip speed/wind speed ratio exceeds the predetermined optimum ratio, the field voltage is increased; and when the actual ratio is below the predetermined ratio, the field voltage is decreased.

* * * * *